Figure 1:
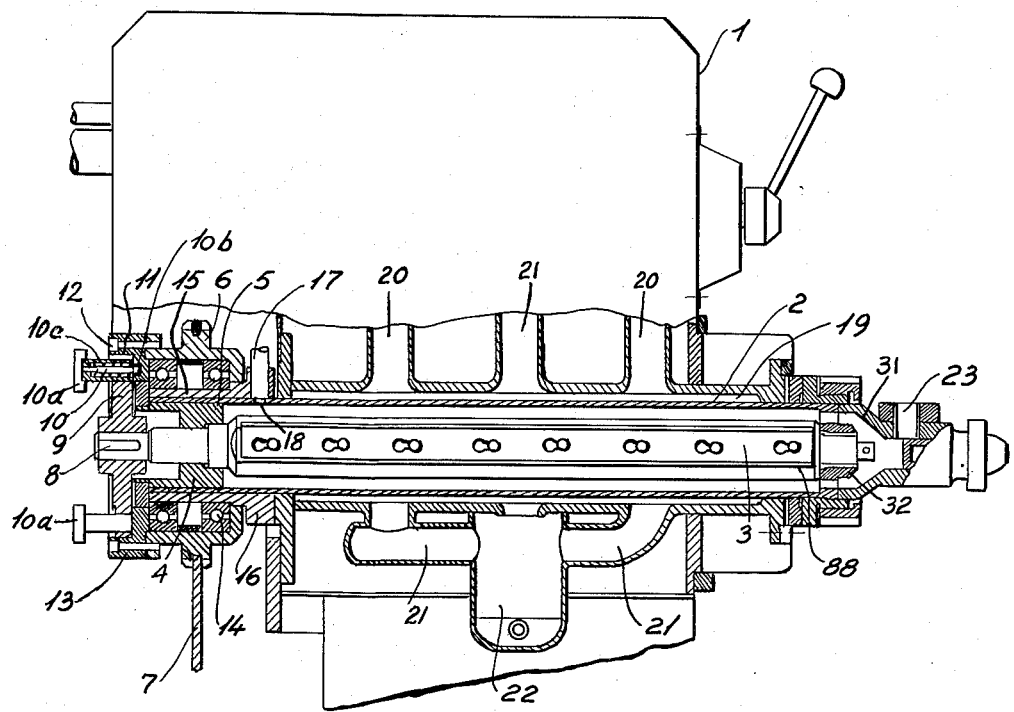

Aug. 29, 1961 H. GRAM 2,997,859
ICE-CREAM FREEZER

Filed April 7, 1959 2 Sheets-Sheet 1

INVENTOR
Hans Gram

BY
Watson, Cole, Grindle & Watson
ATTORNEYS

United States Patent Office 2,997,859
Patented Aug. 29, 1961

2,997,859
ICE-CREAM FREEZER
Hans Gram, Vojens, Denmark, assignor to Brodrene Gram A/S, Vojens, Denmark
Filed Apr. 7, 1959, Ser. No. 804,652
Claims priority, application Denmark Apr. 10, 1958
5 Claims. (Cl. 62—298)

This invention relates to an apparatus for freezing cream, e.g. ice-cream-mix, comprising a freezing cylinder being surrounded by a freezing jacket through which a freezing medium is to be circulated and a scraper being rotatably mounted centrally in said cylinder and having blades in scraping contact with the internal cylindrical refrigerating wall of the freezing cylinder and having a shaft one end of which extends through one end wall of said cylinder and outside said wall is coupled to a primary driving member, e.g. a pulley, mounted coaxially to said cylinder.

In the usual construction of an apparatus of the kind referred to the scraper is coupled to the said primary driving member by means of an intermediate shaft being mounted in a separate support. This support and the said intermediate shaft are to be dismounted together with the said primary driving member each time the scraper is to be removed from the freezing cylinder, e.g. for cleaning purposes or for the purpose of enabling an inspection of the interior of the freezing cylinder. Such cleaning and inspection of ice-cream freezers are to be undertaken frequently and the necessity of dismounting and later on re-mounting said support together with the intermediate shaft and the primary driving member is a rather troublesome task, and besides the said re-mounting demands great carefulness in securing an exact co-axiality of the scraper and the freezing cylinder because otherwise a subsequent effective scraping action would not be obtained and the cylindrical freezing surface of the freezing cylinder would be in danger of being damaged by the scraping edges of the scraper when rotated.

The present invention aids the purpose of simplifying the work to be made in dismounting and subsequent re-mounting the scraper in an apparatus of the kind referred to, and to this end the primary driving member referred to above is according to the invention mounted upon one end of said cylinder. Consequently, the use of a separate supporting member adapted to support the primary driving member and the use of an intermediate shaft for intercoupling the primary driving member and the scraper are avoided and additionally it would not be necessary to dismount the primary driving member in case the scraper is removed from the freezing cylinder for a cleaning or an inspection of the interior of said cylinder.

According to the invention the scraper of the freezing apparatus is coupled to the primary driving member, e.g. a pulley or any other rotary driving member by means of a driving disc being removably attached to the end of the shaft of the scraper which extends through one end wall of the freezing cylinder. A dismounting of the scraper from the said cylinder may simply be undertaken in removing the said driving disc from the shaft of the scraper whereafter the scraper itself is to be removed from the freezing cylinder simply by an axial displacement relative to same.

Besides securing a dismounting and re-mounting of the scraper in a simple way the mounting of the primary driving member upon one end of the freezing cylinder involves the advantage that the dimension of the apparatus in direction of the axis of the freezing cylinder would be smaller than in prior art.

Figure 3:
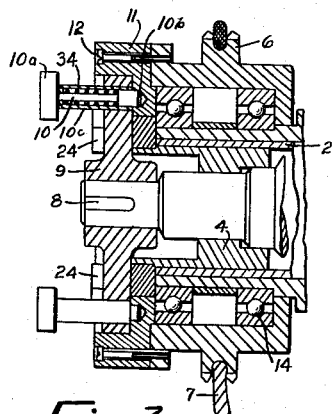
Figure 2:
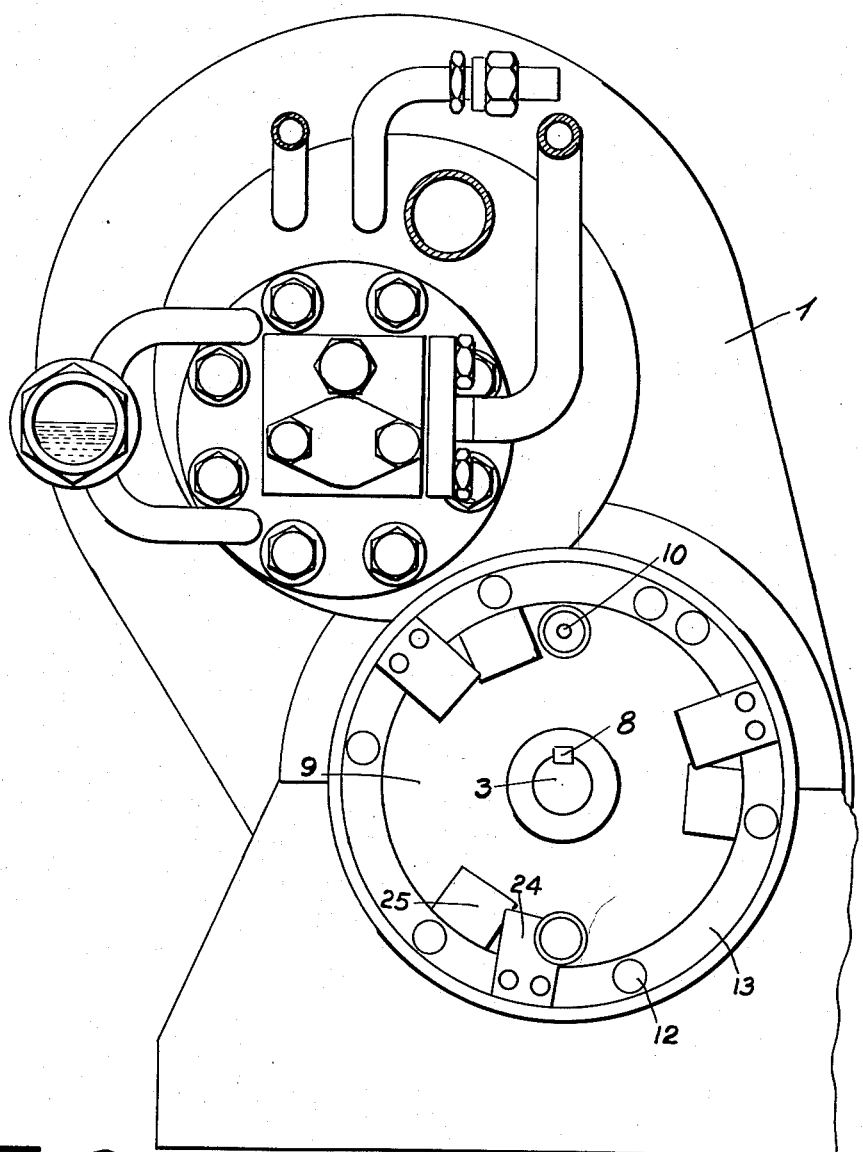

On the drawing:
FIG. 1 shows a freezing apparatus embodying the present invention in a sectional view,
FIG. 2 shows an end view of the freezing apparatus, and
FIG. 3 shows an enlarged fragmentary sectional view taken on the same plane as FIG. 1 showing the end portion of the freezing cylinder together with the associated driving mechanism.

On the drawing 1 is a casing of a freezing apparatus and 2 a freezing cylinder inserted in said apparatus. A rotary agitator comprising a shaft 88 and a number of axially disposed scraper blades 3 secured to said shaft is mounted in the cylinder 2 so as to be rotatable about the axis of same. One end 8 of said shaft extends through one end wall 4 of the freezing zone of the freezing cylinder which end wall comprises a stuffing box closing the appurtenant end of the freezing cylinder in a fluid-tight manner.

The agitator is arranged to be rotated by a primary driving member 6 which is rotatably mounted on one end 5 of the freezing cylinder 2 which end extends beyond the adjacent side wall of the apparatus 1. In the embodiment shown the primary driving member is a cord-pulley being by way of a cord 7 coupled to some suitable driving motor, not shown, which motor may be mounted e.g. below the freezing apparatus.

The shaft 88 of the agitator is by way of a wedge or in any other well known manner in rotary engagement with a driving disc or clutch member 9 mounted upon the end 8 of said shaft. The driving disc 9 is coupled to a cooperating clutch element or annular coupling member 11 located between said disc 9 and the primary driving member 6, coaxially to same, by means of a number of axially disposed coupling pins 10, each of which is slidably mounted within a tubular pin-holder 10c, FIG. 1, said pin-holders being each located in an axially disposed boring in the body of the driving disc. Each coupling pin 10 is actuated by a helical spring inserted in the appurtenant pin-holder so as to tend to press the coupling pin 10 concerned in an axial direction toward the coupling member 11, being fitted with a number of bores 10b, each adapted to receive one end of a coupling pin 10.

The coupling member 11 is rigidly attached to the primary driving member by means of a number of screws 12 and is consequently caused to rotate when the primary driving member is rotated, and if so the pins 10 would cause the driving disc 9 and consequently the scraper 3 to rotate.

The primary driving member 6 is mounted upon the cylinder 2 by means of a ball bearing 14 having a sleeve surrounding the end 5 of the cylinder 2. The sleeve 15 is provided with a collar 16 having a radially disposed bore for receiving one end of a tube 17 for supplying cream to the freezing cylinder. The wall of the cylinder 2 is fitted with an opening 18 communicating with the said tube 17.

19 is a cooling jacket which in an ordinary manner surrounds the cylinder 2 and to which a refrigerating medium, e.g. liquid ammonia, is to be supplied through a tube 20 and from which vaporized refrigerating medium and liquid sprays are discharged through tubes 21 to a separator of well known kind, not shown, in which separator the said liquid sprays if any are to be separated from the said vapors. At the lower portion of the cooling jacket 19 there is provided an outlet chamber 22 adapted to collect oil, which might be separated from the ammonia supplied to the cooling jacket.

If the scraper 3 for some or other reason, e.g. in case the interior of the freezing cylinder is to be inspected or cleaned, is to be removed from said cylinder then the spring actuated pins 10 being fitted with a head 10a are manually withdrawn from engagement with the holes 10b in the annular coupling member 11 against the action of the spring located in the appurtenant pin-holder 10c and arranged to push the said pins into engagement with the coupling member. The driving disc 9 is subsequently to be rotated manually about its axis to such a position relative to the annular coupling member 11, that two sets of locking members 24 and 25, FIG. 2, on the coupling member 11 and the driving disc 9 respectively are moved free of each other whereafter the driving disc 9 may be displaced axially upon the shaft end 8 of the scraper so as to be removed from the shaft of the scraper and from the adjacent end of the cylinder 2. Subsequently the scraper together with the stuffing box 4 may be removed axially through the opposite end of the cylinder 2 provided the device closing said opposite end of the cylinder is simultaneously or previously dismounted. The interior of the freezing cylinder is then accessible to any cleaning or inspection to its entire radial and axial extension.

23 is a stud for the discharge of the cream frozen in the cylinder 2.

As appears from FIG. 1, the coupling member 11 forms in the embodiment shown on the drawing a portion of the primary driving member, viz. a removable end wall of the hub of said member.

I claim:

1. In an ice cream freezer comprising a tubular freezing cylinder, a rotary agitator located within said cylinder and having a shaft, a removable closure for said cylinder at one end of same, a bearing for one end of said shaft adjacent said closure, a removable closure for the other end of said freezing cylinder, a driving member journalled externally upon and surrounding the last-mentioned end of the freezing cylinder coaxially to same, a clutch member detachably mounted upon said shaft in rotatable driving connection with same and facing the last-mentioned end of said cylinder, and means for releasably interconnecting said clutch member and said driving member.

2. In an ice cream freezer comprising a tubular freezing cylinder, a rotary agitator located within said cylinder and having a shaft, a removable closure for said cylinder at one end of same, a bearing for one end of said shaft adjacent said closure, a removable closure for the opposite end of said cylinder, a driving member journalled externally upon and surrounding the last-mentioned end of the freezing cylinder coaxially to same, a clutch member detachably mounted upon said shaft in rotatable driving connection with same and facing the last-mentioned end of said cylinder and one end face of said primary driving member, a number of spring actuated pins located each slidably in an axially disposed bore in said clutch member and meshing each with an individual one of several axially disposed bores in said adjacent end face of said primary driving member.

3. In an ice cream freezer comprising a tubular freezing cylinder, a rotary agitator located within said cylinder and having a shaft, a removable closure for said cylinder at one end of same, a bearing for one end of said shaft adjacent said closure, a removable closure for the freezing cylinder located within the opposite end of said cylinder and comprising a further bearing for said shaft, a primary driving member journalled externally upon and surrounding the last-mentioned end of the freezing cylinder coaxially to same, a clutch member detachably mounted upon said shaft in rotatable driving connection with same and facing the last-mentioned end of said cylinder and one end face of said primary driving member, a number of spring actuated driving studs located each slidably in an axially disposed bore in said clutch member and meshing each with an individual one of several axially disposed bores in said end face of said primary driving member, a number of circumferentially disposed locking members on said primary driving member and a number of radially disposed locking members on said clutch member arranged each to intermesh one of said circumferentially disposed locking members by angular rotation of said clutch member relatively to the primary driving member, opposite to the driving direction of the driving member.

4. A tubular freezing cylinder of uniform diameter, an agitator journalled for rotation in said cylinder and axially removable and replaceable through one end of said cylinder, an annular driving element encircling said cylinder and supported for rotation about the axis thereof adjacent said end, a driven element mounted on the end of said agitator for rotation therewith at said end of the cylinder, said driven element projecting radially outwardly beyond said cylinder, coupling means releasably coupling the driven element and said driving element for rotation together and against relative axial displacement.

5. The combination of elements defined in claim 4 wherein said driving element comprises an annular pulley supported for rotation coaxially around said end of the cylinder and said driven element comprises a disc coaxially connected to the agitator, said disc extending across and closing the said end of the freezing cylinder and projecting radially outwardly beyond said cylinder for connection to the driving element.

References Cited in the file of this patent
UNITED STATES PATENTS

| | | |
|---|---|---|
| 877,113 | Owens | Jan. 21, 1908 |
| 1,447,497 | Wennerstrom | Mar. 6, 1923 |
| 2,000,730 | Wortmann | May 7, 1935 |
| 2,020,946 | Jordan | Nov. 12, 1935 |
| 2,226,979 | Rahauser | Dec. 31, 1940 |
| 2,280,434 | Huber | Apr. 21, 1942 |
| 2,289,645 | Geistert | July 14, 1942 |
| 2,560,664 | Sammy | July 17, 1951 |

FOREIGN PATENTS

| | | |
|---|---|---|
| 448,177 | France | Nov. 19, 1912 |